United States Patent
Peters

(10) Patent No.: US 9,951,217 B2
(45) Date of Patent: Apr. 24, 2018

(54) COPOLYMER OF A BISPHENOL DIGLYCIDYL ETHER AND A PHENOLPHTHALENE AND/OR A PHENOLPHTHALIMIDINE, METHOD FOR THE PREPARATION THEREOF, ARTICLE COMPRISING THE COPOLYMER, AND COMPOSITIONS COMPRISING THE COPOLYMER

(71) Applicant: SABIC INNOVATIVE PLASTICS IP B.V., Bergen op Zoom (NL)

(72) Inventor: Edward Norman Peters, Lenox, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 163 days.

(21) Appl. No.: 14/168,323

(22) Filed: Jan. 30, 2014

(65) Prior Publication Data
US 2015/0210806 A1 Jul. 30, 2015

(51) Int. Cl.
| | | |
|---|---|---|
| *C08L 37/00* | (2006.01) | |
| *C08L 71/00* | (2006.01) | |
| *C08L 81/06* | (2006.01) | |
| *C08L 77/00* | (2006.01) | |
| *C08L 79/08* | (2006.01) | |
| *C08L 75/04* | (2006.01) | |
| *C08L 77/06* | (2006.01) | |
| *C08G 65/26* | (2006.01) | |
| *C08G 59/06* | (2006.01) | |

(52) U.S. Cl.
CPC ............ *C08L 37/00* (2013.01); *C08G 59/066* (2013.01); *C08G 65/2612* (2013.01); *C08G 65/2633* (2013.01); *C08L 71/00* (2013.01); *C08L 81/06* (2013.01); *C08G 2650/56* (2013.01); *C08L 75/04* (2013.01); *C08L 77/00* (2013.01); *C08L 77/06* (2013.01); *C08L 79/08* (2013.01)

(58) Field of Classification Search
None
See application file for complete search history.

(56) References Cited

U.S. PATENT DOCUMENTS

| | | | | |
|---|---|---|---|---|
| 4,912,172 | A * | 3/1990 | Hallgren | C08G 59/682 523/427 |
| 5,814,373 | A * | 9/1998 | White | C08G 59/066 426/415 |
| 7,825,198 | B2 | 11/2010 | Arima et al. | |
| 8,552,105 | B2 | 10/2013 | Peters | |
| 8,686,079 | B2 | 4/2014 | Peters | |
| 2007/0123686 | A1 | 5/2007 | Mahood et al. | |
| 2012/0329939 | A1* | 12/2012 | Peters | C08G 65/48 524/505 |
| 2013/0196131 | A1 | 8/2013 | Malinoski et al. | |

OTHER PUBLICATIONS

Everatt, et al. "Investigation by Carbon-13 and Proton NMR Spectorscopy of the Diglycidyl Derivative of Phenolphthalein" Die Angewandte Makromolekulare Chemie, vol. 56; 1976; pp. 157-162 (Nr. 832).
International Search Report dated Mar. 27, 2015; International Application No. PCT/US2015/010221; International Filing Date Jan. 6, 2015 (4 pages).
Shih, et al. "Synthesis and Characterization of Phenoxy Resins Prepared from Diglycidyl Ether of Bisphenol A and Various Aromatic Dihydroxyl Monomers", Journal of Applied Polymer Science, 1999, vol. 73, No. 12, pp. 2369-2376 (abstract only).
Written Opinion dated Mar. 27, 2015; International Application No. PCT/US2015/010221; International Filing Date Jan. 6, 2015 (6 pages).
International Preliminary Report on Patentability dated May 10, 2016; International Application No. PCT/US2015/010221; International Filing Date Jan. 6, 2015 (6 pages).
Senger, et al., "Synthesis and Determination of Chain Branching in Linear, High Molecular Weight Polyhydroxyethers", Polymer Preprints, 1986, pp. 144-146.

\* cited by examiner

*Primary Examiner* — Randy P Gulakowski
*Assistant Examiner* — Ha S Nguyen
(74) *Attorney, Agent, or Firm* — Cantor Colburn LLP

(57) ABSTRACT

A copolymer exhibiting improved heat resistance relative to phenolic resins is formed by the reaction of a bisphenol diglycidyl ether and a phenolphthalein and/or a phenolphthalimidine in a molar ratio of 0.98:1 to 1.02:1 in the presence of a catalyst. The copolymer can be used to mold plastic parts. The copolymer is also useful as a flexibilizer in thermoset compositions, and useful as a compatibilizer in blends of polar and non-polar polymers, and blends of non-polar polymers and polar fillers.

5 Claims, No Drawings

COPOLYMER OF A BISPHENOL DIGLYCIDYL ETHER AND A PHENOLPHTHALENE AND/OR A PHENOLPHTHALIMIDINE, METHOD FOR THE PREPARATION THEREOF, ARTICLE COMPRISING THE COPOLYMER, AND COMPOSITIONS COMPRISING THE COPOLYMER

BACKGROUND OF THE INVENTION

Poly(hydroxy ether)s, also known as phenoxy resins, are thermoplastics prepared by reaction of bisphenol A with epoxy resins to form a linear thermoplastic with repeat units having the structure

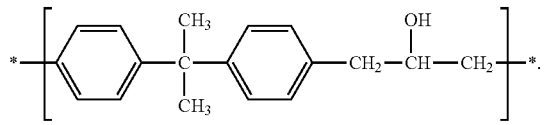

The backbone ether linkages and pendant hydroxyl groups promote wetting and bonding to polar substrates and fillers, and phenoxy resins are therefore used to enhance the properties of coatings, adhesives, inks, composites, fibers and plastics.

Although poly(hydroxy ether)s are good electrical insulators and have good impact resistance and excellent dimensional stability below 80° C., they have glass transition temperatures of about 90° C. So, their properties begin to rapidly decline as the temperature approaches 90° C. For uses at or above 90° C., there is therefore a need for poly(hydroxy ether)s with higher glass transition temperatures.

BRIEF SUMMARY OF EMBODIMENTS OF THE INVENTION

One embodiment is a copolymer comprising repeat units having the structure

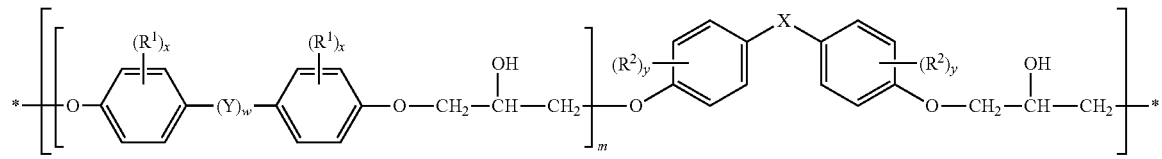

wherein the average value of m is 1.2 to 10 for the copolymer; each occurrence of w is independently 0 or 1; each occurrence of x and y is independently 0, 1, 2, 3, or 4; each occurrence of $R^1$ and $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; each occurrence of X is independently

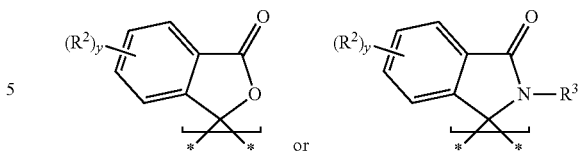

wherein y and $R^2$ are defined above, and each occurrence of $R^3$ is independently hydrogen, or unsubstituted or substituted $C_1$-$C_{12}$ hydrocarbyl; and each occurrence of Y is independently

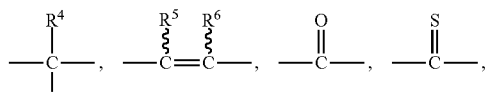

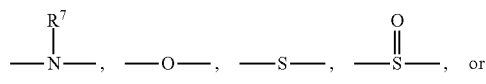

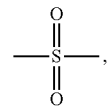

wherein each occurrence of $R^4$, $R^5$, $R^6$, and $R^7$ is independently hydrogen or an unsubstituted or substituted $C_1$-$C_{12}$ hydrocarbyl.

Another embodiment is a method of forming a copolymer, the method comprising: reacting an oligomeric bisphenol diglycidyl ether and a phenolphthalein or phenolphthalimidine in a molar ratio of 0.98:1 to 1.02:1 in the presence of a tertiary amine catalyst to form a copolymer.

Another embodiment is an article comprising the copolymer.

These and other embodiments are described in detail below.

DETAILED DESCRIPTION OF THE INVENTION

The present inventor has determined that the need for a poly(hydroxy ether) with a glass transition temperatures above 90° C. is fulfilled by a copolymer of an oligomeric bisphenol diglycidyl ether and a phenolphthalein or phenolphthalimidine. Thus, one embodiment is a copolymer comprising repeat units having the structure

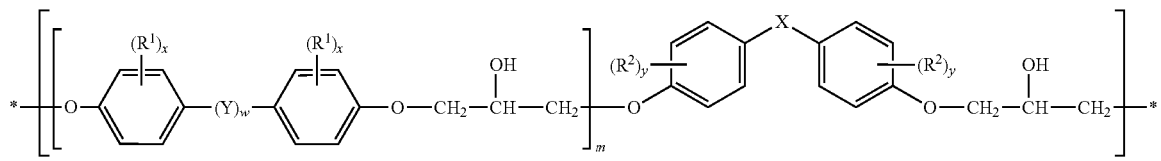

wherein the average value of m (that is, the average of all occurrences of m) is 1.2 to 10 for the copolymer; each occurrence of w is independently 0 or 1; each occurrence of x and y is independently 0, 1, 2, 3, or 4; each occurrence of $R^1$ and $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; each occurrence of X is independently

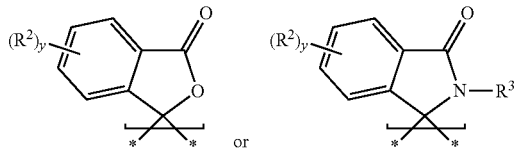

wherein y and $R^2$ are defined above, and each occurrence of $R^3$ is independently hydrogen, or unsubstituted or substituted $C_1$-$C_{12}$ hydrocarbyl; and each occurrence of Y is independently

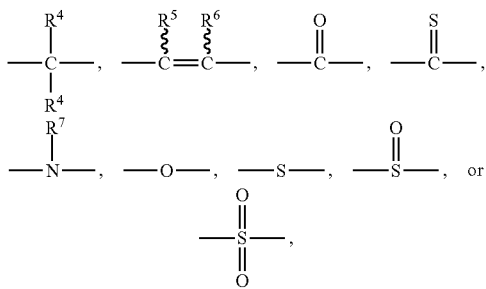

wherein each occurrence of $R^4$, $R^5$, $R^6$, and $R^7$ is independently hydrogen or an unsubstituted or substituted $C_1$-$C_{12}$ hydrocarbyl.

As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen.

In the structure of the copolymer repeat unit above, the oligomeric nature of the bisphenol diglycidyl ether is reflected in the average value of m for the copolymer (that is, the average of all occurrences of m for the copolymer), which is 1.2 to 10. Within this range, the average value of m can be 1.3 to 8, specifically 1.5 to 7.

In the structure of the copolymer repeat unit above, the structural variable "w" signifies the presence (w=1) or absence (w=0) of a divalent linking group between the two phenoxy ether moieties derived from the oligomeric bisphenol diglycidyl ether. Thus, each occurrence of w is independently 0 or 1. In some embodiments, w is 0. In some embodiments, w is 1. When w is 1, the divalent linking group Y is present, and each occurrence of Y is independently

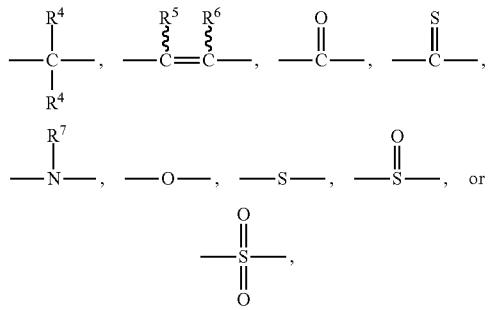

wherein each occurrence of $R^4$, $R^5$, $R^6$, and $R^7$ is independently hydrogen or an unsubstituted or substituted $C_1$-$C_{12}$ hydrocarbyl. In some embodiments, each occurrence of $R^4$, $R^5$, $R^6$, and $R^7$ is independently hydrogen or an unsubstituted $C_1$-$C_{12}$ hydrocarbyl.

In the structure of the copolymer repeat unit above, each occurrence of x is the number of substituents on the respective phenylene group of the phenoxy ether moieties derived from the oligomeric bisphenol diglycidyl ether. Each occurrence of x can have a value of 0, 1, 2, 3, or 4. In some embodiments, each occurrence of x is 0, in which case, a hydrogen atom occupies each unsubstituted position on the 1,2-phenylene ring. When x is 1, 2, 3, or 4, the respective phenylene group has a number of substituents of $R^1$ equal to the value of x. Each occurrence of $R^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl.

In some embodiments, w is 0, and

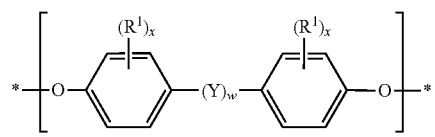

is the residue of a dihydroxybiphenyl compound such as 4,4'-dihydroxybiphenyl, 3,4'-dihydroxybiphenyl, 3,3'-dihydroxybiphenyl, 3,3',5,5'-tetramethyl-4,4'-dihydroxybiphenyl, or 2,2',3,3',5,5'-hexamethyl-4,4'-dihydroxybiphenyl.

In some embodiments, w is 1, and

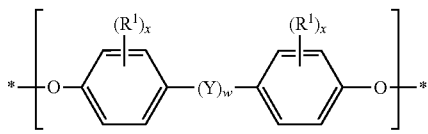

is the residue of a bisphenol such as bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 6,6'-dihydroxy-3,3,3',3'-tetramethylspiro(bis)indane ("spirobiindane bisphenol"), 3,3-bis(4-hydroxyphenyl)phthalimide, 2,7-dihydroxyphenoxathin, 3,6-dihydroxydibenzofuran, 3,6-dihydroxydibenzothiophene, or 2,7-dihydroxycarbazole.

In the structure of the copolymer repeat unit above, each occurrence of X is independently

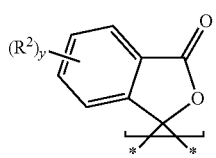 or 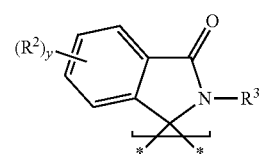

wherein each occurrence of y is independently 0, 1, 2, 3, or 4; each occurrence of $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; and each occurrence of $R^3$ is independently hydrogen, or unsubstituted or substituted $C_1$-$C_{12}$ hydrocarbyl. In some embodiments, each occurrence of y is 0.

In some embodiments, at least one occurrence of X is

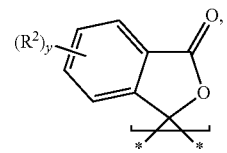

wherein each occurrence of y is independently 0, 1, 2, 3, or 4; and each occurrence of $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl. In some embodiments, each occurrence of y is 0.

In some embodiments, at least one occurrence of X is

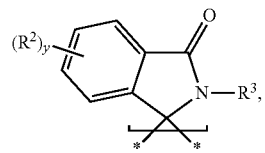

wherein each occurrence of y is independently 0, 1, 2, 3, or 4; each occurrence of $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; and each occurrence of $R^3$ is independently $C_1$-$C_{12}$ alkyl, or unsubstituted or substituted phenyl. In some embodiments, $R^3$ is phenyl. In some embodiments, each occurrence of X is

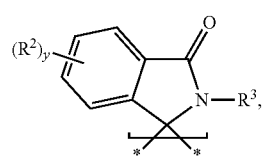

each occurrence of y is 0, and each occurrence of $R^3$ is phenyl.

In some embodiments, the copolymer has a weight average molecular weight of 10,000 to 100,000 atomic mass units. Within this range, the weight average molecular weight can be 15,000 to 70,000 atomic mass units, specifically 20,000 to 40,000 atomic mass units. Weight average molecular weight can be determined by gel permeation chromatography using polystyrene standards.

In a very specific embodiment of the copolymer comprising repeat units having the structure

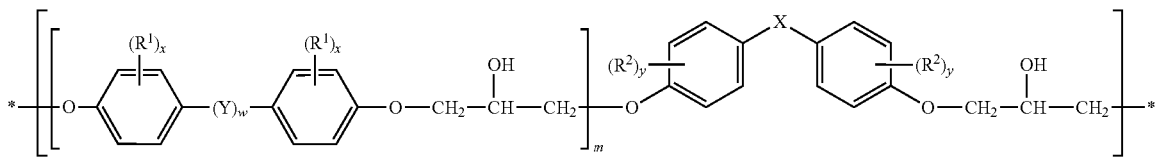

the average value of m is 1.5 to 7; each occurrence of w is 1; each occurrence of x and y is 0;

each occurrence of X is

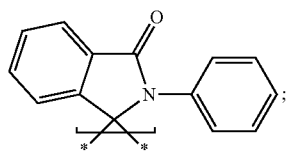 [SMILES: *C1(*)c2ccccc2C(=O)N1c1ccccc1]

each occurrence of Y is

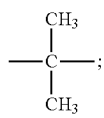

and the copolymer has a weight average molecular weight of 20,000 to 40,000 atomic mass units.

The copolymer can be formed by the reaction of an oligomeric bisphenol diglycidyl ether and a phenolphthalein or phenolphthalimidine. Specifically, one method of forming a copolymer comprises: reacting (a) an oligomeric bisphenol diglycidyl ether and (b) a phenolphthalein, a phenolphthalimidine, or a combination thereof in the presence of a tertiary amine catalyst to form a copolymer; wherein the molar ratio of (a) an oligomeric bisphenol diglycidyl ether to (b) a phenolphthalein, a phenolphthalimidine, or a combination thereof is 0.98:1 to 1.02:1. Within the range of 0.98:1 to 1.02:1, the molar ratio of the oligomeric bisphenol diglycidyl ether to the phenolphthalein and/or phenolphthalimidine can be 0.99:1 to 1.01:1.

In some embodiments, the oligomeric bisphenol diglycidyl ether has the structure

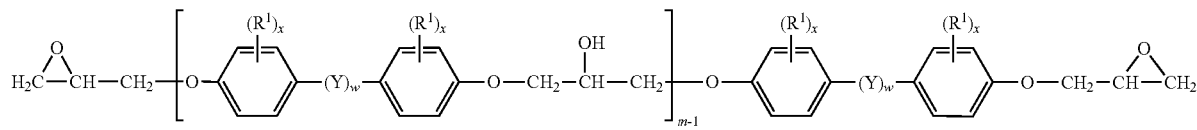

wherein m is, on average, 1.2 to 10; the phenolphthalein has the structure

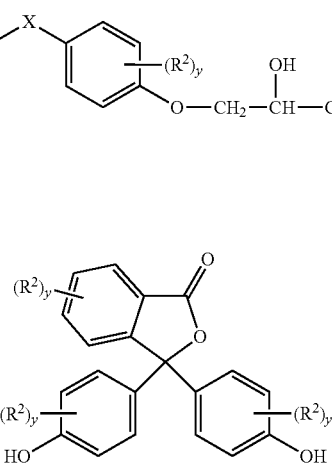

wherein each occurrence of y is independently 0, 1, 2, 3, or 4; and each occurrence of $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; and the phenolphthalimidine has the structure

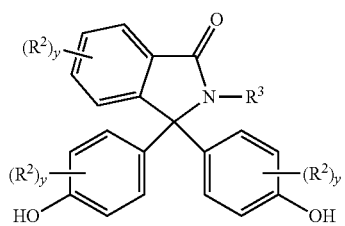

wherein y and $R^2$ are as defined above, and $R^3$ is independently hydrogen, or unsubstituted or substituted $C_1$-$C_{12}$ hydrocarbyl.

Suitable tertiary amine catalysts include, for example, triethylamine, tri-n-propylamine, tri-n-butylamine, dimethylaniline, diethylaniline, alpha-methylbenzyldimethylamine, N,N-dimethylaminoethanol, N,N-dimethylaminopyridine, alkylimidazoles, and combinations thereof. In some embodiments, the catalyst comprises N,N-dimethylaminopyridine.

The reaction can be conducted in the presence of a solvent. Suitable solvents include aromatic hydrocarbons, chlorinated hydrocarbons, and polar aprotic solvents. Suitable polar aprotic solvents are ketones, esters, ethers, amides, nitriles, sulfoxides, sulfones, and combinations thereof. In some embodiments, the solvent comprises cyclohexanone.

The method is capable of producing a high molecular weight copolymer. In some embodiments, the copolymer has a weight average molecular weight of 10,000 to 100,000 atomic mass units. Within this range, the weight average molecular weight can be 15,000 to 70,000, specifically 20,000 to 40,000.

In some embodiments, the oligomeric bisphenol diglycidyl ether is added to the phenolphthalein, phenolphthalimidine, or combination thereof so that there is always an excess of phenolic groups over epoxy groups in the reaction mixture. The oligomeric bisphenol diglycidyl ether can be added in portions over about 15 to about 300 minutes, specifically about 30 to about 270 minutes, more specifically about 45 to about 240 minutes, still more specifically about 60 to about 210 minutes, and even more specifically about 90 to about 180 minutes. After addition of the oligomeric bisphenol diglycidyl ether to the phenolphthalein, phenolphthalimidine, or combination thereof is complete, the mixture can be stirred for about 1 to about 12 hours at the reaction temperature. The reaction can be conducted at a temperature of about 100 to about 200° C., specifically, about 120 to about 180° C., more specifically, about 130 to about 170° C., and still more specifically, about 140 to about 160° C.

In a very specific embodiment of the method of producing the copolymer, the oligomeric bisphenol diglycidyl ether and the phenolphthalimidine are in a molar ratio of 0.99:1 to 1.01:1; the oligomeric bisphenol diglycidyl ether has the structure

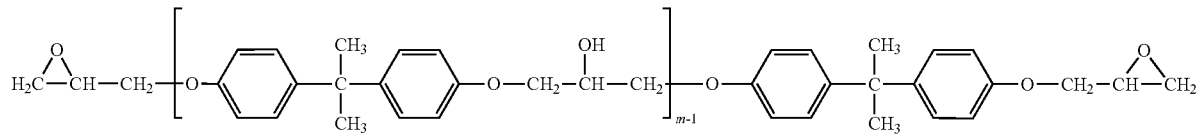
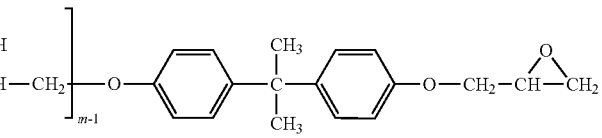

wherein m is, on average, 1.5 to 7; the phenolphthalimidine has the structure

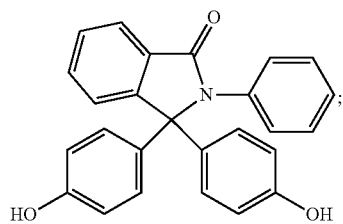 [SMILES: O=C1c2ccccc2C(c2ccc(O)cc2)(c2ccc(O)cc2)N1c1ccccc1]

and the copolymer has a weight average molecular weight of 20,000-40,000 atomic mass units.

The copolymer can be used to form articles, including toys, display casings, and housings for consumer electronic or office equipment.

The copolymer can also be used as a flexibilizer for crosslinked phenolic and epoxy resins in adhesives, coating, and composites. Thus, one embodiment is a composition comprising 80 to 99 weight percent of a thermoset resin comprising aromatic groups, and 1 to 20 weight percent of the copolymer. All of the variations of the copolymer described above apply as well to the copolymer as a flexibilizer. Another embodiment is an article comprising the composition comprising 80 to 99 weight percent of a thermoset resin comprising aromatic groups, and 1 to 20 weight percent of the copolymer. Uses of the composition in such articles include, for example, wire coatings, printed circuit board coatings, coatings for flexible packaging, coatings for rigid packaging, can coatings, coil coatings, pipe coatings, tie layers, wood coatings, plastic coatings, and glass coatings, The copolymer can also be used as a compatibilizer in blends of polar and non-polar polymers. Thus, one embodiment is a composition comprising, based on the total weight of the composition, 2 to 20 weight percent of the copolymer, 5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof, and 30 to 93 weight percent of a polar polymer selected from the group consisting of cellulose esters, poly(alkyl(meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof. All of the variations of the copolymer described above apply as well to the copolymer as a compatibilizer.

The copolymer can also be used as a compatibilizer in blends of polar fillers and non-polar polymers. Thus, one embodiment is a composition comprising, based on the total weight of the composition, 2 to 20 weight percent of the copolymer; 30 to 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and 5 to 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof.

In a very specific embodiment of the article, in the copolymer comprising repeat units having the structure

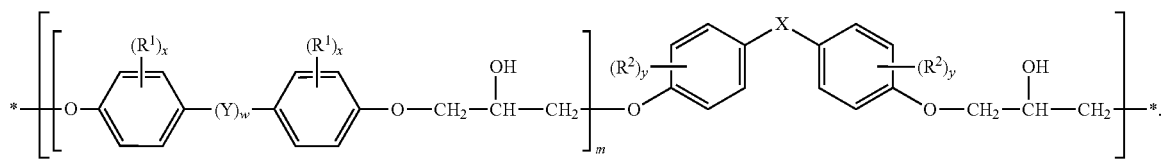

the average value of m is 1.5 to 7; each occurrence of w is 1; each occurrence of x and y is 0; each occurrence of X is

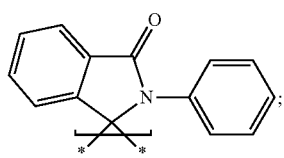

each occurrence of Y is

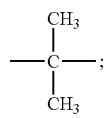

and the copolymer has a weight average molecular weight of 20,000 to 40,000 atomic mass units.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1

A copolymer comprising repeat units having the structure

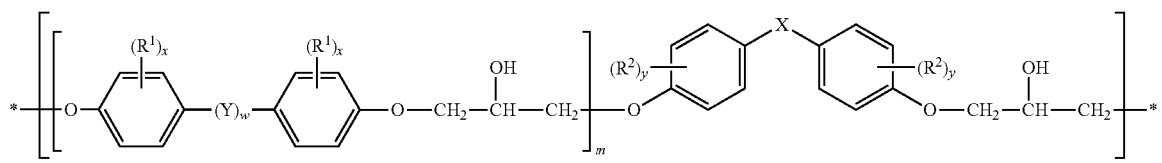

wherein the average value of m is 1.2 to 10 for the copolymer; each occurrence of w is independently 0 or 1; each occurrence of x and y is independently 0, 1, 2, 3, or 4; each occurrence of $R^1$ and $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; each occurrence of X is independently

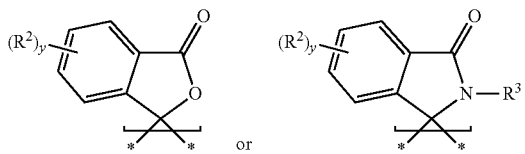

wherein y and $R^2$ are defined above, and each occurrence of $R^3$ is independently hydrogen, or unsubstituted or substituted $C_1$-$C_{12}$ hydrocarbyl; and each occurrence of Y is independently

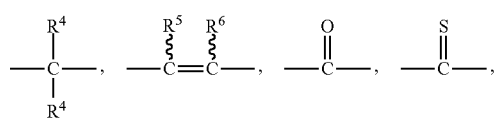

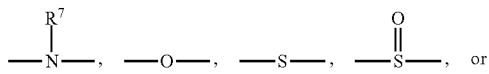

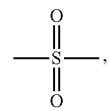

wherein each occurrence of $R^4$, $R^5$, $R^6$, and $R^7$ is independently hydrogen or an unsubstituted or substituted $C_1$-$C_{12}$ hydrocarbyl.

Embodiment 2

The copolymer of embodiment 1, wherein the average value of m is 1.5 to 7 for the copolymer.

Embodiment 3

The copolymer of embodiment 1 or 2, wherein each occurrence of X is

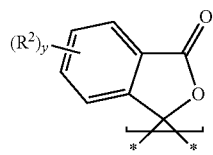

wherein y and $R^2$ are as defined in embodiment 1.

Embodiment 4

The copolymer of embodiment 1 or 2, wherein each occurrence of X is

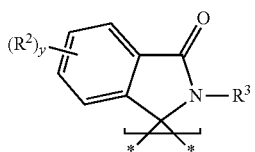

wherein y, $R^2$, and $R^3$ are as defined in embodiment 1.

Embodiment 5

The copolymer of any of embodiments 1-4, wherein each occurrence of w is 1, and each occurrence of Y is

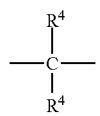

wherein $R^4$ is as defined in embodiment 1.

Embodiment 6

The copolymer of any of embodiments 1-5, having a weight average molecular weight of 10,000 to 100,000 atomic mass units.

Embodiment 7

The copolymer of embodiment 1, wherein the average value of m is 1.5 to 7; each occurrence of w is 1; each occurrence of x and y is 0; each occurrence of X is

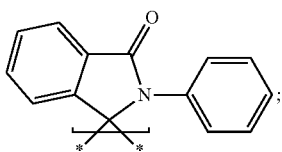 [SMILES: *C1(*)c2ccccc2C(=O)N1c1ccccc1]

each occurrence of Y is

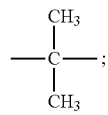

and the copolymer has a weight average molecular weight of 20,000 to 40,000 atomic mass units.

Embodiment 8

A method of forming a copolymer, the method comprising: reacting an oligomeric bisphenol diglycidyl ether and a phenolphthalein, a phenolphthalimidine, or a combination thereof in a molar ratio of 0.98:1 to 1.02:1 in the presence of a tertiary amine catalyst to form a copolymer.

Embodiment 9

The method of embodiment 8, wherein the oligomeric bisphenol diglycidyl ether has the structure

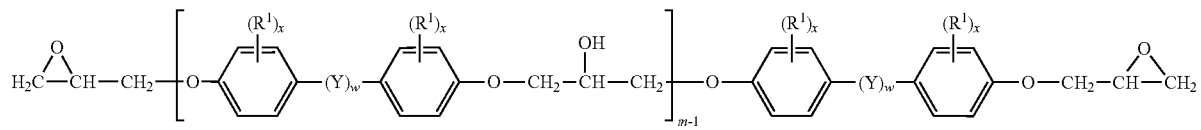

wherein m is, on average, 1.2 to 10; the phenolphthalein has the structure

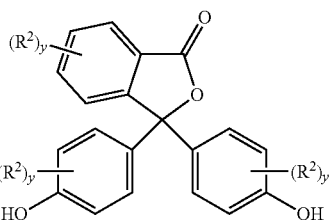

wherein each occurrence of y is independently 0, 1, 2, 3, or 4; and each occurrence of $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; and the phenolphthalimidine has the structure

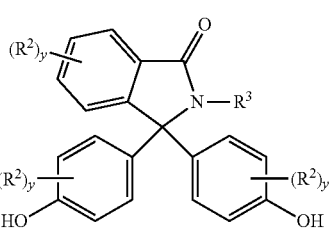

wherein y and $R^2$ are as defined above, and $R^3$ is independently hydrogen, or unsubstituted or substituted $C_1$-$C_{12}$ hydrocarbyl.

Embodiment 10

The method of embodiment 8 or 9, wherein the tertiary amine catalyst comprises triethylamine, tri-n-propylamine, tri-n-butylamine, dimethylaniline, diethylaniline, alpha-methylbenzyldimethylamine, N,N-dimethylaminoethanol, N,N-dimethylaminopyridine, alkylimidazoles, or a combination thereof.

Embodiment 11

The method of any of embodiments 8-10, having a weight average molecular weight of 10,000 to 100,000 atomic mass units.

Embodiment 12

The method of embodiment 8, wherein said reacting comprises reacting the oligomeric bisphenol diglycidyl ether and the phenolphthalimidine in a molar ratio of 0.99:1 to 1.01:1; wherein the oligomeric bisphenol diglycidyl ether has the structure

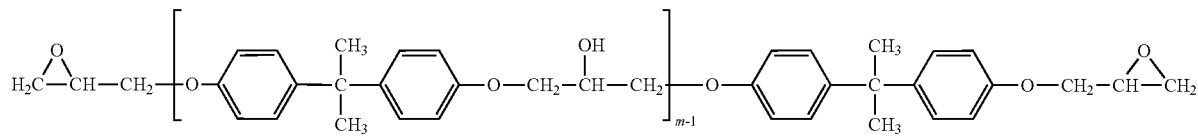

wherein m is, on average, 1.5 to 7; wherein the phenolphthalimidine has the structure

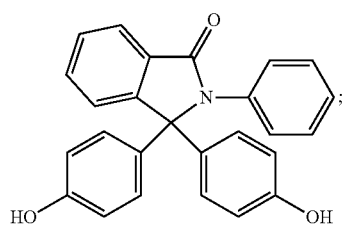

and wherein the copolymer has a weight average molecular weight of 20,000-40,000 atomic mass units.

Embodiment 13

An article, comprising a copolymer comprising repeat units having the structure

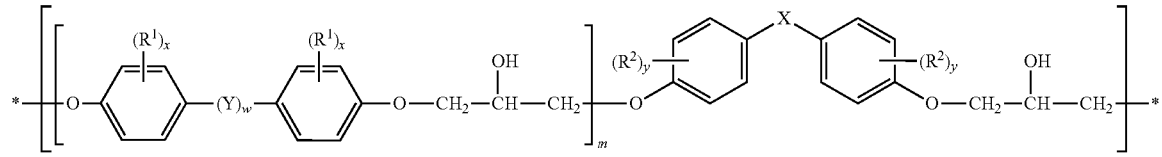

wherein the average value of m is 1.2 to 10 for the copolymer; each occurrence of w is independently 0 or 1; each occurrence of x and y is independently 0, 1, 2, 3, or 4; each occurrence of $R^1$ and $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; each occurrence of X is independently

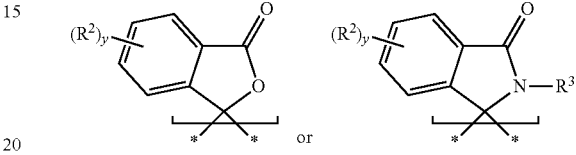

wherein y and $R^2$ are defined above, and each occurrence of $R^3$ is independently hydrogen, or unsubstituted or substituted $C_1$-$C_{12}$ hydrocarbyl; and each occurrence of Y is independently

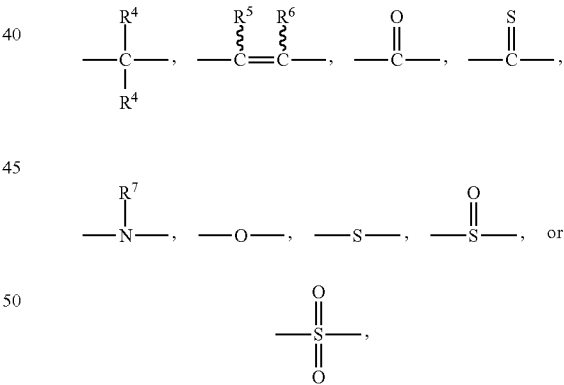

wherein each occurrence of $R^4$, $R^5$, $R^6$, and $R^7$ is independently hydrogen or an unsubstituted or substituted $C_1$-$C_{12}$ hydrocarbyl.

Embodiment 14

The article of embodiment 13, wherein the article is a toy, a display casing, or a housing for consumer electronic or office equipment.

Embodiment 15

The article of embodiment 13 or 14, wherein the average value of m is 1.5 to 7; each occurrence of w is 1; each occurrence of x and y is 0; each occurrence of X is

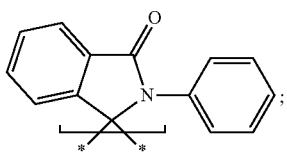

$R^3$ is independently hydrogen, or unsubstituted or substituted $C_1$-$C_{12}$ hydrocarbyl; each occurrence of Y is

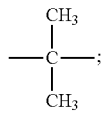

and the copolymer has a weight average molecular weight of 20,000 to 40,000 atomic mass units.

Embodiment 16

A composition comprising, based on the total weight of the composition: 80 to 99 weight percent of a thermoset resin comprising aromatic groups; and 1 to 20 weight percent of a copolymer comprising repeat units having the structure

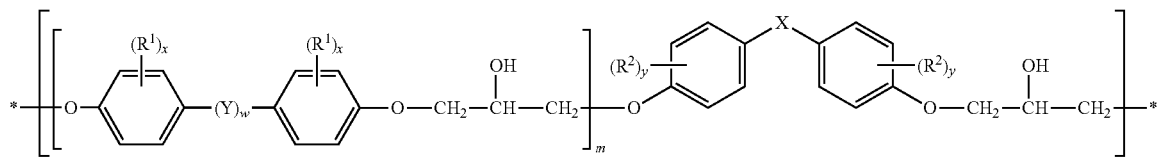

wherein the average value of m is 1.2 to 10 for the copolymer; each occurrence of w is independently 0 or 1; each occurrence of x and y is independently 0, 1, 2, 3, or 4; each occurrence of $R^1$ and $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; each occurrence of X is independently

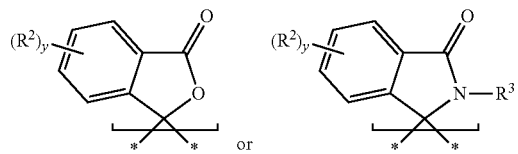

wherein y and $R^2$ are defined above, and each occurrence of $R^3$ is independently hydrogen, or unsubstituted or substituted $C_1$-$C_{12}$ hydrocarbyl; and each occurrence of Y is independently

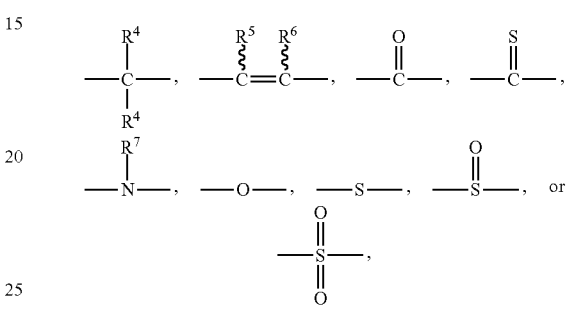

wherein each occurrence of $R^4$, $R^5$, $R^6$, and $R^7$ is independently hydrogen or an unsubstituted or substituted $C_1$-$C_{12}$ hydrocarbyl.

Embodiment 17

A composition comprising, based on the total weight of the composition: 5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; 30 to 93 weight percent of a polar polymer selected from the group consisting of cellulose esters, poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof; and 2 to 20 weight percent of a copolymer comprising repeat units having the structure

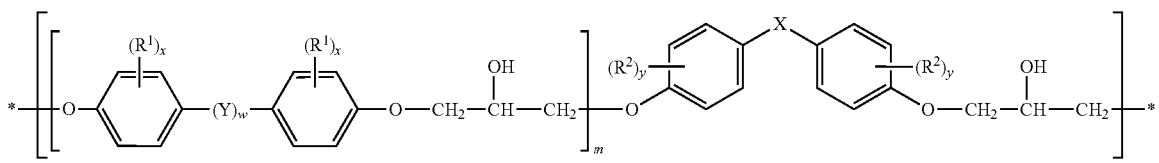

wherein the average value of m is 1.2 to 10 for the copolymer; each occurrence of w is independently 0 or 1; each occurrence of x and y is independently 0, 1, 2, 3, or 4; each occurrence of $R^1$ and $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; each occurrence of X is independently

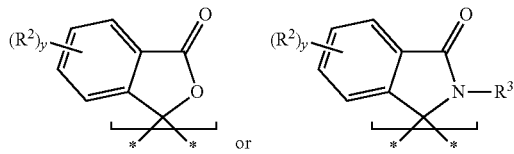

wherein y and $R^2$ are defined above, and each occurrence of $R^3$ is independently hydrogen, or unsubstituted or substituted $C_1$-$C_{12}$ hydrocarbyl; and each occurrence of Y is independently

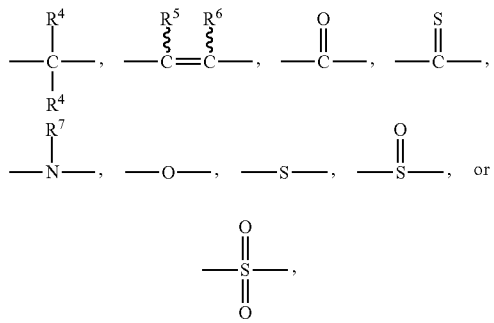

wherein each occurrence of $R^4$, $R^5$, $R^6$, and $R^7$ is independently hydrogen or an unsubstituted or substituted $C_1$-$C_{12}$ hydrocarbyl.

Embodiment 18

A composition comprising, based on the total weight of the composition: 30 to 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; 5 to 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and 2 to 20 weight percent of a copolymer comprising repeat units having the structure

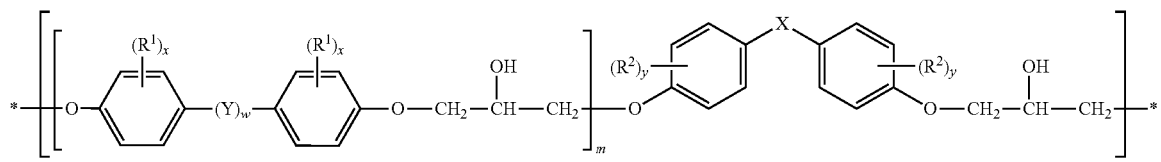

wherein the average value of m is 1.2 to 10 for the copolymer; each occurrence of w is independently 0 or 1; each occurrence of x and y is independently 0, 1, 2, 3, or 4; each occurrence of $R^1$ and $R^2$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; each occurrence of X is independently

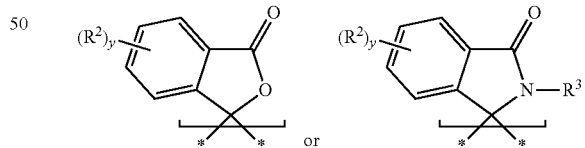

wherein y and $R^2$ are defined above, and each occurrence of $R^3$ is independently hydrogen, or unsubstituted or substituted $C_1$-$C_{12}$ hydrocarbyl; and each occurrence of Y is independently

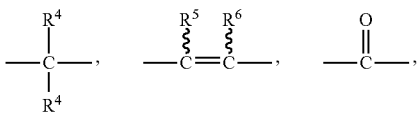

-continued

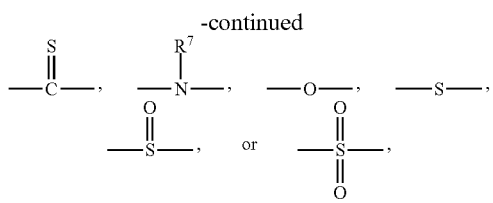

wherein each occurrence of $R^4$, $R^5$, $R^6$, and $R^7$ is independently hydrogen or an unsubstituted or substituted $C_1$-$C_{12}$ hydrocarbyl.

The invention is further illustrated by the following non-limiting examples.

Example 1

This example illustrates the synthesis of a poly(hydroxy ether) copolymer with 11.6 weight percent PPPBP hydroxy ether repeat units. N-Phenyl-3,3-bis(4-hydroxyphenyl) phthalimidine having a purity of 99.909% as determined by HPLC was obtained from Shirdi Chemical PVT. Ltd. and used as received. The diglycidyl ether of bisphenol A was obtained as DER™ 667E from Dow. The monomer characteristics and amounts are summarized in Table 1, where "HEW" stands for hydroxyl equivalent weight in units of grams per equivalent, "EEW" stands for epoxy equivalent weight in units of grams per equivalent.

TABLE 1

| Monomer | Designation | HEW (g/eq.) | EEW (g/eq.) | Grams | Equivalents |
|---|---|---|---|---|---|
| N-Phenyl-3,3-bis(4-hydroxyphenyl) phthalimidine | PPPBP | 196.5 | — | 25.32 | 0.1289 |
| Diglycidyl ether of bisphenol A | DER™ 667E | — | 1774 | 224.68 | 0.1288 |

To a one liter, three-necked, roundbottom flask equipped with a mechanical stirrer, thermocouple probe, powder funnel, and heating mantel was added 250 milliliters cyclohexanone, which was heated to 150° C. The PPPBP was added and dissolved. Then 2.5 grams (0.0205 moles) of N,N-dimethylaminopyridine (DMAP) was added and dissolved. The epoxy resin was added in portions over 150 minutes, approximately following the guidelines in Table 2.

TABLE 2

| Time (min) | PPPBP (wt %) |
|---|---|
| 0 | 48.96 |
| 30 | 20.03 |
| 60 | 13.35 |
| 90 | 8.90 |
| 120 | 7.12 |
| 150 | 1.64 |

The solution was stirred for 7 hours at 150° C. The reaction mixture was cooled below 80° C. and diluted with 200 milliliters 2-butanone. The reaction product was isolated by precipitation in methanol, filtered, washed with methanol, and dried in a vacuum oven at 100° C. The weight of the material was 235 grams (94% yield).

Example 2

This example illustrates the synthesis of a poly(hydroxy ether) copolymer with 21.4 weight percent PPPBP hydroxy ether repeat units. The diglycidyl ether of bisphenol A was obtained as EPON™ 1004F from Momentive. The monomer characteristics and amounts are summarized in Table 3.

TABLE 3

| Monomer | Designation | HEW (g/eq.) | EEW (g/eq.) | Grams | Equivalents |
|---|---|---|---|---|---|
| N-Phenyl-3,3-bis(4-hydroxyphenyl) phthalimidine | PPPBP | 196.5 | — | 46.81 | 0.23822 |
| Diglycidyl ether of bisphenol A | EPON™ 1004F | — | 853 | 203.19 | 0.23821 |

To a one liter, three-necked, roundbottom flask equipped with a mechanical stirrer, thermocouple probe, powder funnel, and heating mantel was added 250 milliliters cyclohexanone, which was heated to 150° C. The PPPBP was added and dissolved. Then 2.5 grams (0.0205 moles) of N,N-dimethylaminopyridine (DMAP) was added and dissolved. The epoxy resin was added in portions over 150 minutes, approximately following the guidelines in Table 4.

TABLE 4

| Time (min) | PPPBP (wt %) |
|---|---|
| 0 | 54.14 |
| 30 | 19.69 |
| 60 | 12.30 |
| 90 | 7.38 |
| 120 | 4.92 |
| 150 | 1.57 |

The solution was stirred for 7 hours at 150° C. The reaction mixture was cooled below 80° C. and diluted with 200 milliliters 2-butanone. The reaction product was isolated by precipitation in methanol, filtered, washed with methanol, and dried in a vacuum oven at 100° C. The weight of the material was 239 grams (95.6% yield).

Example 3

This example illustrates the synthesis of a poly(hydroxy ether) copolymer with 31.0 weight percent PPPBP hydroxy ether repeat units. The diglycidyl ether of bisphenol A was obtained as EPON™ 1001F from Momentive. The monomer identities and amounts are summarized in Table 5.

TABLE 5

| Monomer | Designation | HEW (g/eq.) | EEW (g/eq.) | Grams | Equivalents |
|---|---|---|---|---|---|
| N-Phenyl-3,3-bis(4-hydroxyphenyl) phthalimidine | PPPBP | 196.5 | — | 67.81 | 0.34509 |

TABLE 5-continued

| Monomer | Designation | HEW (g/eq.) | EEW (g/eq.) | Grams | Equivalents |
|---|---|---|---|---|---|
| Diglycidyl ether of bisphenol A | EPON™ 1001F | — | 528 | 182.19 | 0.34506 |

To a one liter, three-necked, roundbottom flask equipped with a mechanical stirrer, thermocouple probe, powder funnel, and heating mantel was added 250 milliliters cyclohexanone, which was heated to 150° C. The PPPBP was added and dissolved. Then 2.5 grams (0.0205 moles) of N,N-dimethylaminopyridine (DMAP) was added and dissolved. The epoxy resin was added in portions over 150 minutes, approximately following the guidelines in Table 4.

TABLE 6

| Time (min) | PPPBP (wt %) |
|---|---|
| 0 | 54.89 |
| 30 | 21.95 |
| 60 | 13.72 |
| 90 | 7.14 |
| 120 | 1.65 |
| 150 | 0.65 |

The solution was stirred for 7 hours at 150° C. The reaction mixture was cooled below 80° C. and diluted with 200 milliliters 2-butanone. The reaction product was isolated by precipitation in methanol, filtered, washed with methanol, and dried in a vacuum oven at 100° C. The weight of the material was 229 grams (91.6% yield).

Example 4

This example illustrates the synthesis of a poly(hydroxy ether) copolymer with 14.4 weight percent PPPBP hydroxy ether repeat units. The diglycidyl ether of bisphenol A was obtained as DER™ 6155 from Dow. The monomer identities and amounts are summarized in Table 7.

TABLE 7

| Monomer | Designation | HEW (g/eq.) | EEW (g/eq.) | Grams | Equivalents |
|---|---|---|---|---|---|
| N-Phenyl-3,3-bis(4-hydroxyphenyl)phthalimidine | PPPBP | 196.5 | — | 31.47 | 0.16015 |
| Diglycidyl ether of bisphenol A | DER™ 6155 | — | 1365 | 218.53 | 0.16010 |

To a one liter, three-necked, roundbottom flask equipped with a mechanical stirrer, thermocouple probe, powder funnel, and heating mantel was added 250 milliliters cyclohexanone, which was heated to 150° C. The PPPBP was added and dissolved. Then 2.5 grams (0.0205 moles) of N,N-dimethylaminopyridine (DMAP) was added and dissolved. The epoxy resin was added in portions over 150 minutes, approximately following the guidelines in Table 8.

TABLE 8

| Time (min) | PPPBP (wt %) |
|---|---|
| 0 | 50.33 |
| 30 | 25.17 |
| 60 | 11.44 |
| 90 | 7.78 |
| 120 | 4.58 |
| 150 | 0.70 |

The solution was stirred for 7 hours at 150° C. The reaction mixture was cooled below 80° C. and diluted with 200 milliliters 2-butanone. The reaction product was isolated by precipitation in methanol, filtered, washed with methanol, and dried in a vacuum oven at 100° C. The weight of the material was 234 grams (93.6% yield).

Example 5

This example illustrates the synthesis of a poly(hydroxy ether) copolymer with 21.4 weight percent PPPBP hydroxy ether repeat units. The diglycidyl ether of bisphenol A was obtained as EPON™ 1004F from Momentive. The monomer identities and amounts are summarized in Table 9. Example 5 is similar to Example 2, except that Example 5 uses different monomer amounts and addition times.

TABLE 9

| Monomer | Designation | HEW (g/eq.) | EEW (g/eq.) | Grams | Equivalents |
|---|---|---|---|---|---|
| N-Phenyl-3,3-bis(4-hydroxyphenyl)phthalimidine | PPPBP | 196.5 | — | 46.93 | 0.23883 |
| Diglycidyl ether of bisphenol A | EPON™ 1004F | — | 853 | 203.69 | 0.23879 |

To a one liter, three-necked, roundbottom flask equipped with a mechanical stirrer, thermocouple probe, powder funnel, and heating mantel was added 250 milliliters cyclohexanone, which was heated to 150° C. The PPPBP was added and dissolved. Then 2.5 grams (0.0205 moles) of N,N-dimethylaminopyridine (DMAP) was added and dissolved. The epoxy resin was added in portions over 150 minutes, approximately following the guidelines in Table 10.

TABLE 10

| Time (min) | PPPBP (wt %) |
|---|---|
| 0 | 54.13 |
| 30 | 22.15 |
| 60 | 12.30 |
| 90 | 7.38 |
| 120 | 3.45 |
| 150 | 0.59 |

The solution was stirred for 7 hours at 150° C. The reaction mixture was cooled below 80° C. and diluted with 200 milliliters 2-butanone. The reaction product was isolated by precipitation in methanol, filtered, washed with methanol, and dried in a vacuum oven at 100° C. The weight of the material was 227 grams (90.6% yield).

Example 6

This example illustrates the synthesis of a poly(hydroxy ether) copolymer with 21.4 weight percent PPPBP hydroxy ether repeat units. The diglycidyl ether of bisphenol A was obtained as EPON™ 1004F from Momentive. The monomer identities and amounts are summarized in Table 11. Example 6 is similar to Example 3, except that Example 6 uses different monomer amounts and addition times.

TABLE 11

| Monomer | Designation | HEW (g/eq.) | EEW (g/eq.) | Grams | Equivalents |
|---|---|---|---|---|---|
| N-Phenyl-3,3-bis (4-hydroxyphenyl) phthalimidine | PPPBP | 196.5 | — | 67.94 | 0.34575 |
| Diglycidyl ether of bisphenol A | EPON™ 1001F | — | 528 | 182.52 | 0.34568 |

To a one liter, three-necked, roundbottom flask equipped with a mechanical stirrer, thermocouple probe, powder funnel, and heating mantel was added 250 milliliters cyclohexanone, which was heated to 150° C. The PPPBP was added and dissolved. Then 2.5 grams (0.0205 moles) of N,N-dimethylaminopyridine (DMAP) was added and dissolved. The epoxy resin was added in portions over 150 minutes, approximately following the guidelines in Table 12.

TABLE 12

| Time (min) | PPPBP (wt %) |
|---|---|
| 0 | 54.34 |
| 30 | 22.50 |
| 60 | 13.17 |
| 90 | 7.68 |
| 120 | 1.66 |
| 150 | 0.65 |

The solution was stirred for 7 hours at 150° C. The reaction mixture was cooled below 80° C. and diluted with 200 milliliters 2-butanone. The reaction product was isolated by precipitation in methanol, filtered, washed with methanol, and dried in a vacuum oven at 100° C. The weight of the material was 238 grams (95% yield).

Characterization of Polyhydroxyethers

Comparative Example 1 was a copolymer of bisphenol A and bisphenol A diglycidyl ether, obtained as InChemRez™ PKHC Phenoxy Resin. Characterization of the Examples 1-5 and Comparative Example 1 is summarized in Table 13, where PPPBP PHE (wt %) is the weight percent of PPPBP poly(hydroxy ether) repeat units based on the total weight of the copolymer; "$T_g$ (° C.)" is the glass transition temperature in degrees centigrade; "$M_w$ (AMU)" is the weight average molecular weight in atomic mass units; "$M_n$ (AMU)" is the number average molecular weight in atomic mass units; and "$M_w/M_n$" is the polydispersity. All copolymers exhibited single glass transition temperatures by Differential Scanning calorimetry (DSC). The glass transition temperatures increase with increased content of PPPBP. Glass transition temperature ($T_g$) was measured by differential scanning calorimetry (DSC) according to ASTM D3418-08. Number average molecular weight ($M_n$), weight average molecular weight ($M_w$), and polydispersity ($M_w/M_n$) were determined by gel permeation chromatography (GPC) using polystyrene standards on an Agilent 1100 Series HPLC System with two Phenomenex PHENOGEL™ 5μ Linear columns and a UV detector. Chloroform with 50 parts per million by weight dibutylamine was the eluent. The injection volume was 50 microliters.

The higher glass transition temperatures for phthalimidine bisphenol poly(hydroxy ether) copolymers relative to bisphenol A poly(hydroxy ether) copolymers will allow them to be used at substantially higher temperatures in applications including molded articles, adhesives, coatings, and thermosets.

TABLE 13

| | PPPBP PHE (wt %) | $T_g$ (° C.) | $M_w$ (AMU) | $M_n$ (AMU) | $M_w/M_n$ |
|---|---|---|---|---|---|
| C. Ex. 1 | 0 | 90 | 52000 | 10200 | 5.10 |
| Ex. 1 | 11.6 | 117 | 26700 | 7200 | 3.71 |
| Ex. 2 | 21.4 | 128 | 28300 | 7530 | 3.76 |
| Ex. 3 | 31.0 | 137 | 30450 | 7870 | 3.87 |
| Ex. 4 | 14.4 | 124 | 30990 | 8330 | 3.72 |
| Ex. 5 | 21.4 | 131 | 32800 | 8620 | 3.81 |
| Ex. 6 | 31.0 | 140 | 35990 | 9100 | 3.96 |

The invention claimed is:

1. A method of forming a copolymer, the method comprising:

adding an oligomeric bisphenol diglycidyl ether to an N-phenylphenolphthalimidine wherein the phenyl group bound to nitrogen is unsubstituted or substituted in a molar ratio of 0.98:1 to 1.02:1 in the presence of a tertiary amine catalyst to form a reaction mixture; and reacting the oligomeric bisphenol diglycidyl ether and the N-phenylphenolphthalimidine to form a copolymer;

wherein the oligomeric bisphenol diglycidyl ether is added to the N-phenylphenolphthalimidine such that an excess of phenolic groups relative to epoxy groups is maintained in the reaction mixture.

2. The method of claim 1, wherein the oligomeric bisphenol diglycidyl ether has the structure

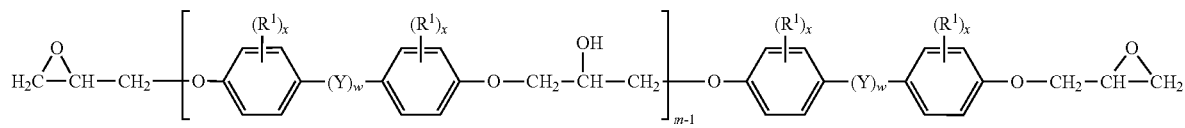

wherein m is, on average, 1.2 to 10; each occurrence of w is independently 0 or 1; each occurrence of x is independently 0, 1, 2, 3, or 4; each occurrence of $R^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl; and each occurrence of Y is independently

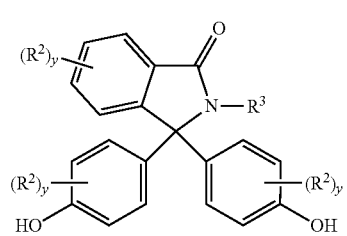

wherein each occurrence of $R^4$, $R^5$, $R^6$, and $R^7$ is independently hydrogen or an unsubstituted or substituted $C_1$-$C_{12}$ hydrocarbyl; and the N-phenylphenolphthalimidine has the structure

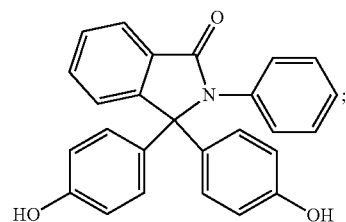

wherein each occurrence of y is independently 0, 1, 2, 3, or 4; and each occurrence of $R^2$ is independently halogen, $C_1$-$C_{12}$ hydrocarbylthio, $C_1$-$C_{12}$ hydrocarbyloxy, $C_2$-$C_{12}$ halohydrocarbolyoxy wherein at least two carbon atoms separate the halogen and oxygen atoms, or unsubstituted or substituted $C_1$-$C_{12}$ hydrocarbyl; and $R^3$ is independently unsubstituted or substituted phenyl.

3. The method of claim 1, wherein the tertiary amine catalyst comprises triethylamine, tri-n-propylamine, tri-n-butylamine, dimethylaniline, diethylaniline, alpha-methylbenzyldimethylamine, N,N-dimethylaminoethanol, N,N-dimethylaminopyridine, alkylimidazoles, or a combination thereof.

4. The method of claim 1, wherein the copolymer has a weight average molecular weight of 10,000 to 100,000 atomic mass units.

5. The method of claim 1,
wherein said reacting comprises reacting the oligomeric bisphenol diglycidyl ether and the N-phenylphenolphthalimidine in a molar ratio of 0.99:1 to 1.01:1;
wherein the oligomeric bisphenol diglycidyl ether has the structure

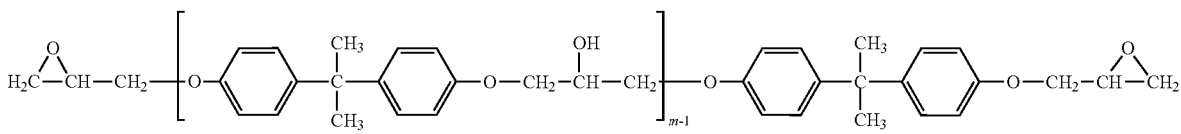

wherein m is, on average, 1.5 to 7;
wherein the N-phenylphenolphthalimidine has the structure and
wherein the copolymer has a weight average molecular weight of 20,000-40,000 atomic mass units.

* * * * *